US007942292B2

(12) United States Patent  
Ceccarelli et al.

(10) Patent No.: US 7,942,292 B2  
(45) Date of Patent: *May 17, 2011

(54) PRE-MEASURED MATERIAL DISPENSER WITH PIVOTING RESERVOIR

(75) Inventors: Loreto Ceccarelli, Maple (CA); Antonio Ceccarelli, Woodbridge (CA)

(73) Assignee: Metcon Plastics International Inc. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/789,911

(22) Filed: May 28, 2010

(65) Prior Publication Data

US 2010/0230445 A1 Sep. 16, 2010

Related U.S. Application Data

(63) Continuation of application No. 11/244,556, filed on Oct. 6, 2005, now Pat. No. 7,726,523.

(51) Int. Cl.  
*G01F 11/26* (2006.01)

(52) U.S. Cl. .................. 222/456; 222/464.1; 222/464.3

(58) Field of Classification Search .............. 222/424.5, 222/454, 456, 464.1–464.3, 464.5, 464.7  
See application file for complete search history.

(56) References Cited

U.S. PATENT DOCUMENTS

| 1,735,784 | A | 11/1929 | Gustav |
| 2,792,158 | A | 5/1957 | Veitch, Sr. et al. |
| 4,763,817 | A | 8/1988 | Lee |
| 5,323,938 | A | 6/1994 | Ceccarelli et al. |
| 6,076,708 | A | 6/2000 | Ceccarelli et al. |

FOREIGN PATENT DOCUMENTS

| DE | 2 219 582 A1 | 10/1973 |
| WO | WO 95/23577 | 9/1995 |
| WO | WO 02/12838 A1 | 2/2002 |

OTHER PUBLICATIONS

Supplementary European Search Report for Application No. EP 06 79 0788.2, dated Dec. 4, 2008.

*Primary Examiner* — J. Casimer Jacyna  
(74) *Attorney, Agent, or Firm* — Bliss McGlynn, P.C.

(57) ABSTRACT

A device for dispensing a pre-measured amount of material from a container having a closed bottom, a mouth opening and a side wall. The device includes a discharge tube and a measuring reservoir pivotably attached to a lower end of the discharge tube for capturing a pre-determined amount of material. The reservoir is pivotable from a first position in which the reservoir is substantially parallel to the discharge tube to a second position in which the discharge tube and the reservoir are substantially perpendicular to one another. With the reservoir in the first position, the reservoir and the discharge tube are insertable into a container having a relatively narrow mouth opening. With the reservoir in the second position, the discharge opening of the reservoir communicates with an opening in the second end of the discharge tube, in a dispensing ready position.

17 Claims, 6 Drawing Sheets

PRE-MEASURED MATERIAL DISPENSER WITH PIVOTING RESERVOIR

CROSS-REFERENCE TO RELATED APPLICATIONS

The present application is a continuation of U.S. patent application Ser. No. 11/244,556, filed Oct. 6, 2005 now U.S. Pat. No. 7,726,523, and owned in common herewith, the contents of which are hereby incorporated by reference.

FIELD OF THE INVENTION

The present invention relates to a dispensing device, and more particularly a device for dispensing a pre-measured amount of a liquid or powdered material from inside a container.

DESCRIPTION OF THE RELATED ART

Numerous devices are known for dispensing a measured amount of a liquid or powdered material from inside a container. Most such devices comprise an elongated tube having a flared, funnel-shaped extension at its lower end. The funnel-shaped extension forms the lower reservoir which is used to capture a pre-measured amount of powder from inside the container. An example of such a device is described in U.S. Pat. No. 5,323,938 to Ceccarelli et al.

In order to install such a device in a container, it is necessary to insert the tube and the funnel-shaped extension through the mouth of the container. However, due to the size of the funnel, the usefulness of such devices is necessarily limited to containers having relatively wide mouth openings.

Therefore, there is a need for pre-measured material dispensers which are capable of being installed in a wide variety of containers, including those having relatively narrow mouth openings.

BRIEF SUMMARY OF THE APPLICATION

The present application provides a device for dispensing a pre-measured amount of a material from inside a container, the device being particularly adapted for insertion into containers having relatively narrow mouth openings.

In one aspect, the present application provides device for dispensing a pre-measured amount of material from a container having a closed bottom, a mouth opening and a side wall comprises a discharge tube, connecting means for connecting an upper end of the discharge tube to the mouth opening of the container, a measuring reservoir attached to a lower end of the discharge tube for capturing a pre-determined amount of material, and pivot means pivotably connecting the reservoir to the discharge tube. The reservoir is pivotable from a first position in which the reservoir is substantially parallel to the discharge tube to a second position in which the discharge tube and the reservoir are substantially perpendicular to one another. With the reservoir in the first position, the reservoir and the discharge tube are insertable into a container having a relatively narrow mouth opening. With the reservoir in the second position, the discharge opening of the reservoir communicates with an opening in the second end of the discharge tube, in a dispensing ready position.

In another aspect, the present application discloses a dispensing device for dispensing a pre-measured amount of a material from a container having a closed bottom and a mouth opening. The dispensing device includes a discharge tube having a first end and a second end with openings being provided at the ends to permit flow of the material through the tube, the discharge tube defining a longitudinal tube axis; a connecting collar for connecting the first end of the discharge tube to the mouth opening of the container; and a measuring reservoir attached to the second end of the discharge tube, the reservoir having a side wall defining an inlet opening and a discharge opening and forming an elongate body having a longitudinal reservoir axis. The measuring reservoir is pivotably connected to the discharge tube about a transverse pivot axis perpendicular to the longitudinal tube axis and to the longitudinal reservoir axis. The reservoir being pivotable from a first position in which the tube axis is substantially parallel to the reservoir axis to a second position in which the tube axis and the reservoir axis are substantially perpendicular to one another. With the reservoir in the first position, the reservoir and the discharge tube are insertable through the mouth opening of the container and, with the reservoir in the second position, the discharge opening of the reservoir communicates with and sealingly engages the opening in the second end of the discharge tube. A portion of the reservoir and a portion of the discharge tube may be in overlapping relation, while in either the first position or the second position.

In yet another aspect, the present application describes a container for dispensing a pre-measured amount of a material. The container includes a container wall defining a mouth opening and a closed bottom of the container; and a dispensing device. The dispensing device includes a discharge tube having a first end and a second end with openings being provided at the ends to permit flow of the material through the tube, the discharge tube defining a longitudinal tube axis, a connecting collar connecting the first end of the discharge tube to the mouth opening of the container, and a measuring reservoir attached to the second end of the discharge tube, the reservoir having a side wall defining an inlet opening and a discharge opening and forming an elongate body having a longitudinal reservoir axis. The measuring reservoir is pivotably connected to the discharge tube about a transverse pivot axis perpendicular to the longitudinal tube axis and to the longitudinal reservoir axis. Before insertion into the container, the reservoir is pivotable from a first position in which the tube axis is substantially parallel to the reservoir axis to a second position in which the tube axis and the reservoir axis are substantially perpendicular to one another. With the reservoir in the first position, the reservoir and the discharge tube are insertable through the mouth opening of the container and, with the reservoir in the second position, the discharge opening of the reservoir communicates with and sealingly engages the opening in the second end of the discharge tube. The reservoir is held in the second position after insertion into the container due to contact with the closed bottom end of the container that causes the reservoir to pivot into and stay in the second position. A portion of the reservoir and a portion of the discharge tube are in overlapping relation in either the first position or the second position.

Other aspects and features of the present application will be apparent to those of ordinary skill in the art from a review of the following detailed description when considered in conjunction with the drawings.

BRIEF DESCRIPTION OF THE DRAWINGS

Reference will now be made, by way of example, to the accompanying drawings which show an embodiment of the present application, and in which.

Similar reference numerals are used in different figures to denote similar components.

DESCRIPTION OF SPECIFIC EMBODIMENTS

Figure 1:
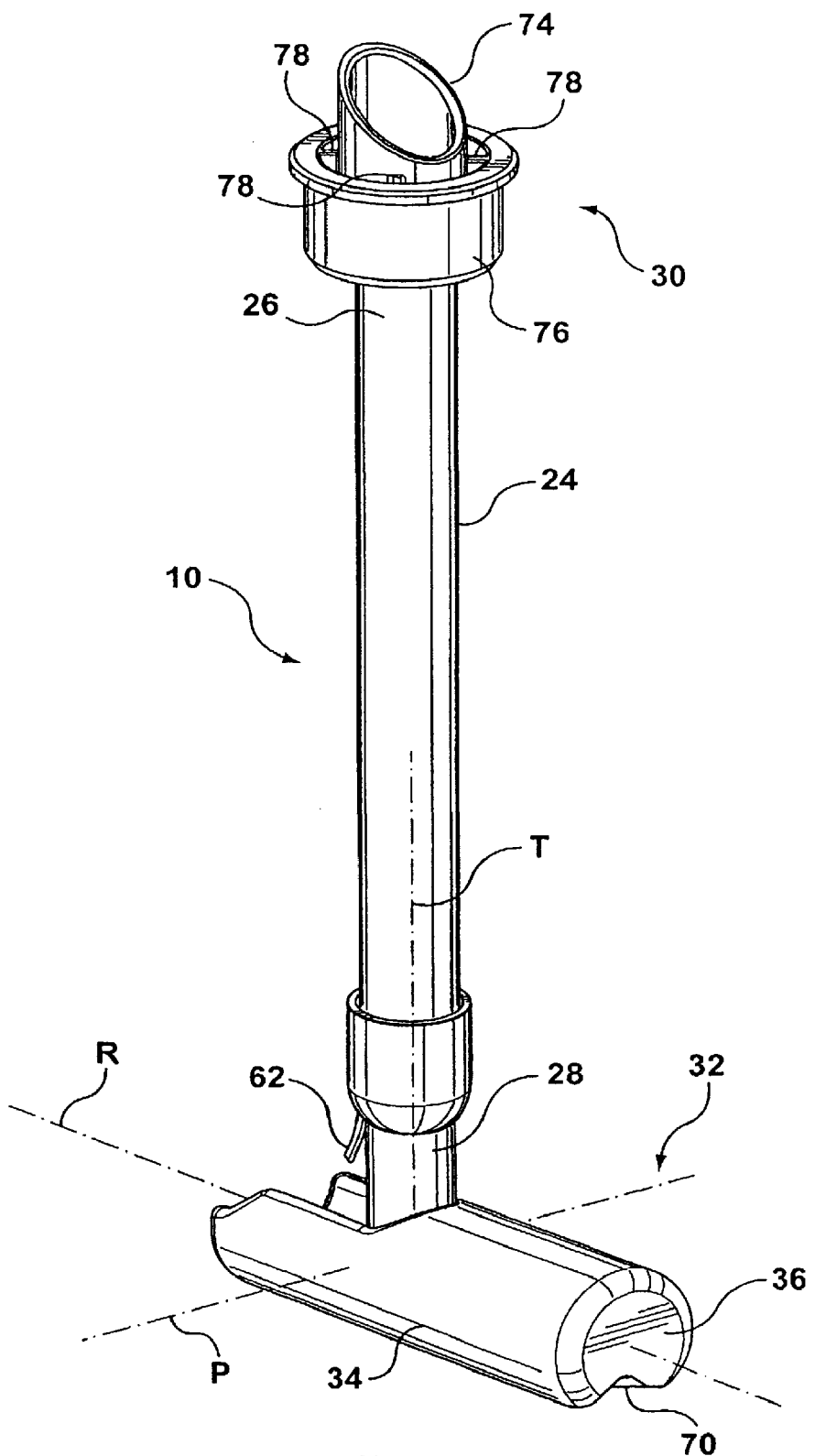
FIG. 1 shows a perspective view of a dispensing device with a reservoir substantially perpendicular to a discharge tube.
Figure 6:
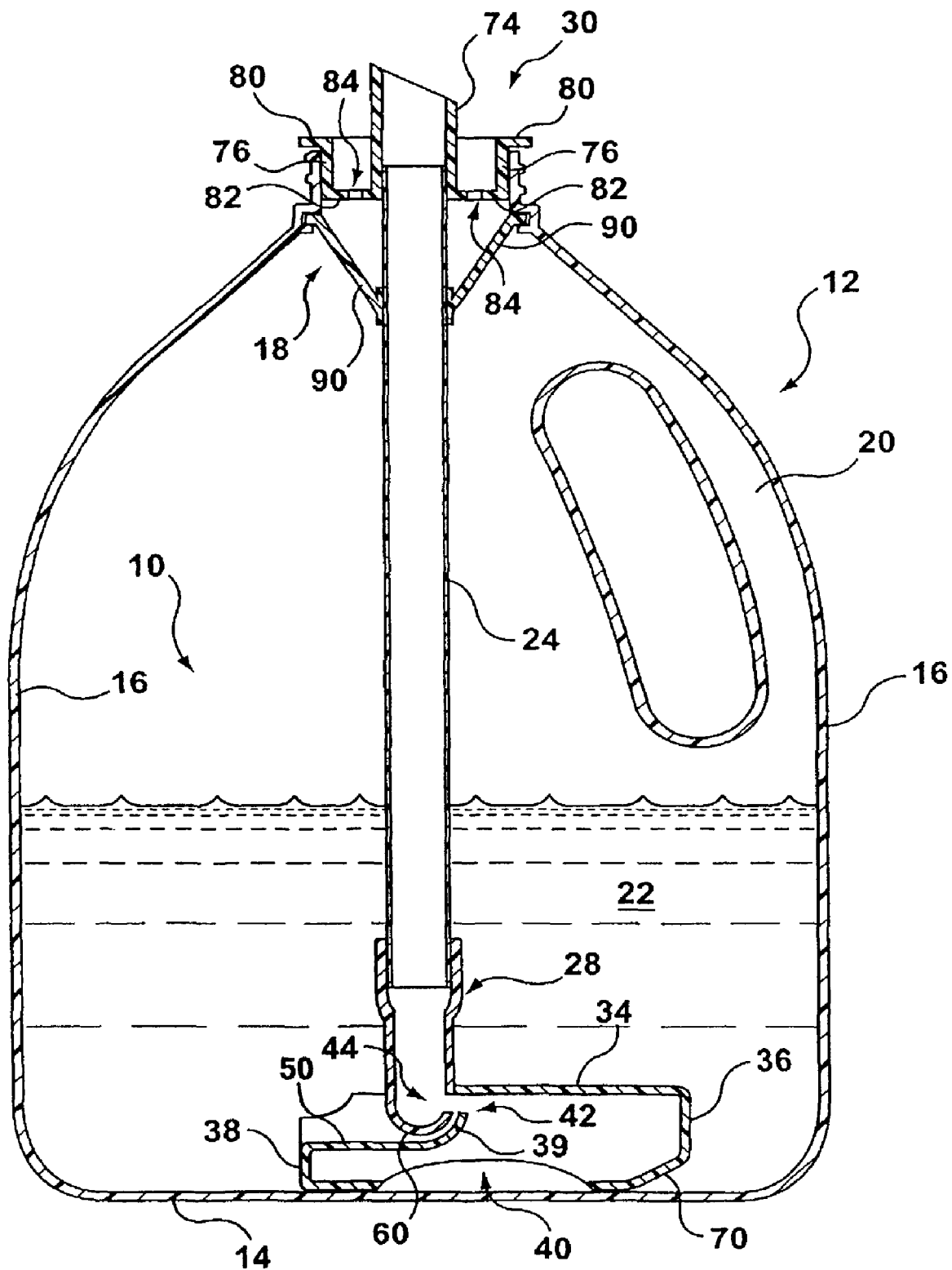
FIG. 6 shows a cross-sectional view of an embodiment of a dispensing device inserted within a container.

Referring to the accompanying drawings, FIG. 1 shows a perspective view of a dispensing device 10 and FIG. 6 shows a cross-sectional view of the dispensing device 10 inserted within a container 12. The dispensing device 10 is designed to fit inside the container 12. The container 12 is shown as having a bottom 14, a sidewall 16, a mouth opening 18 and a handle 20. The container 12 is filled with a material 22 which is to be dispensed from the container 12. The material 22 may be a liquid in some embodiments. In some embodiments, the material 22 may be a powder.

The dispensing device 10 comprises a vertical discharge tube 24 having an upper end 26 (also referred to herein as the "first end") and a lower end 28 (also referred to herein as the "second end"), a connecting collar 30 attached to the upper end 26 of tube 24 for connecting the device 10 to the mouth opening 18, and a measuring reservoir 32 pivotably attached to the lower end 28 of tube 24.

Measuring reservoir 32 comprises an elongate body extending along a reservoir axis R, and in one embodiment includes a generally cylindrical side wall 34 with closed end walls 36 and 38. The reservoir 32 has an inlet opening 40 through which material 22 enters the reservoir and a discharge opening 42 through which the material 22 leaves the reservoir. The inlet opening 40 of device 10 may be formed in the side wall 34 intermediate the two closed end walls 36 and 38. As shown in the drawings, the inlet opening 40 is elongate along the reservoir axis R and is substantially centrally located between the end walls 36 and 38 of reservoir 32.

Figure 2:
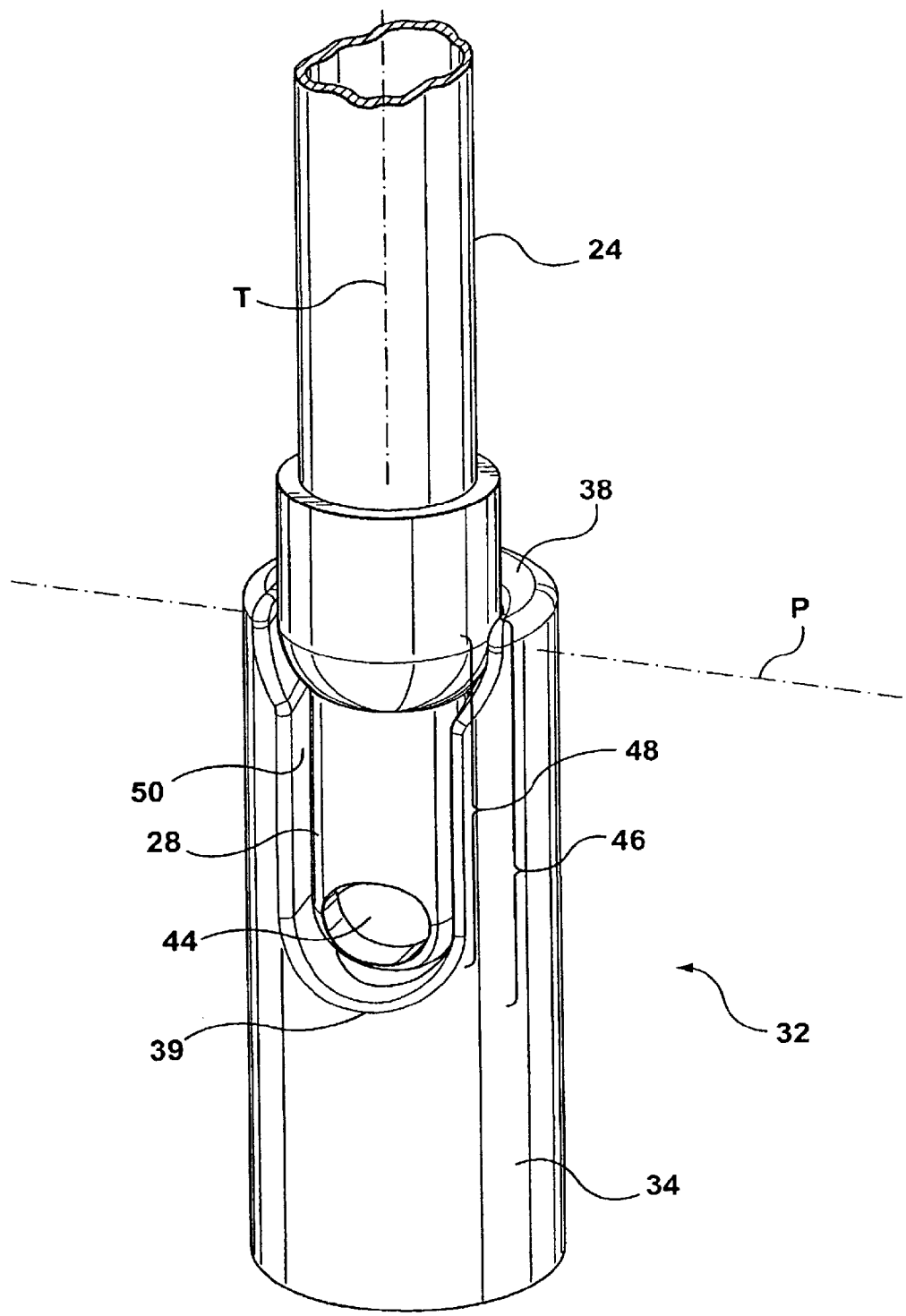
FIG. 2 shows a perspective view of a lower portion of the dispensing device of FIG. 1 with the reservoir substantially parallel to the discharge tube.

As can be seen from FIGS. 1 and 2, the reservoir 32 is pivotably connected to the lower end 28 of discharge tube 24. The pivot axis P about which the reservoir pivots extends through the lower end 28 of discharge tube 24 transverse to tube axis T and through reservoir 32 intermediate the two closed ends 36 and 38 and substantially transverse to the reservoir axis R.

The diameter of the cylindrical side wall 34 of reservoir 32 is smaller than the diameter of the mouth opening 18. This permits the reservoir 32 to be inserted through the mouth opening 18 with the reservoir 32 substantially parallel to the discharge tube 24 as shown in FIG. 2. With the reservoir 32 substantially perpendicular to the discharge tube 24 as shown in FIG. 1, the discharge opening 42 of the reservoir communicates with an opening 44 at the lower end 28 of discharge tube 24 and the inlet opening 40 faces the bottom 14 of container 12. The positions of the reservoir 32 shown in FIGS. 1 and 2 are also referred to herein as the "second position" and the "first position", respectively.

Although the embodiment shown in the drawings features the inlet opening 40 on the underside of the measuring reservoir 32 when in the second position, it will be appreciated that in some embodiments, the inlet opening 40 may be positioned at the side of the measuring reservoir 32, or partly between the side and the underside. In yet other embodiments, the inlet opening 40 may be positioned in the closed end wall 36. In one embodiment, the closed end wall 36 is substantially removed so as to form the inlet opening 40. Other variations in placement or formation of the inlet opening 40 will be appreciated by those ordinarily skilled in the art.

Since the pivot axis P extends through reservoir 32 intermediate its end walls 36 and 38, a portion 46 of reservoir 32 is adjacent to, or "overlaps", a portion 48 of the discharge tube 24 when the reservoir 32 is in the position shown in FIG. 2. With the reservoir in this position, it will be appreciated that the combined diameter of the overlapping portions 46 and 48 of reservoir 32 may be smaller than the diameter of the mouth opening 18 to allow device 10 to be inserted into container 12. To reduce the combined diameter of the overlapping portions 46 and 48, the overlapping portion 48 of the discharge tube 24 may be nested with the overlapping portion 46 of the reservoir 32. Therefore, the side wall 34 of reservoir 32 is provided with a concave portion 50 into which the overlapping portion 48 of discharge tube 24 can be nested. In some embodiments, the degree of nesting is such that the combined diameter of overlapping portions 46 and 48 is substantially the same as the diameter of the reservoir 32. This permits the reservoir 32 to have a diameter which is only slightly less than that of the mouth opening 18.

The concave portion 50 is coincident with the overlapping portion 46 of reservoir 32 and extends from crescent-shaped end wall 38 to point 39, which is slightly beyond the location of pivot axis P. In one embodiment, to ensure that the inlet opening 40 of the reservoir 32 will face the bottom 14 of container 12, the concave portion 50 and the inlet opening 40 are located on opposite sides of reservoir 32.

Figure 4:
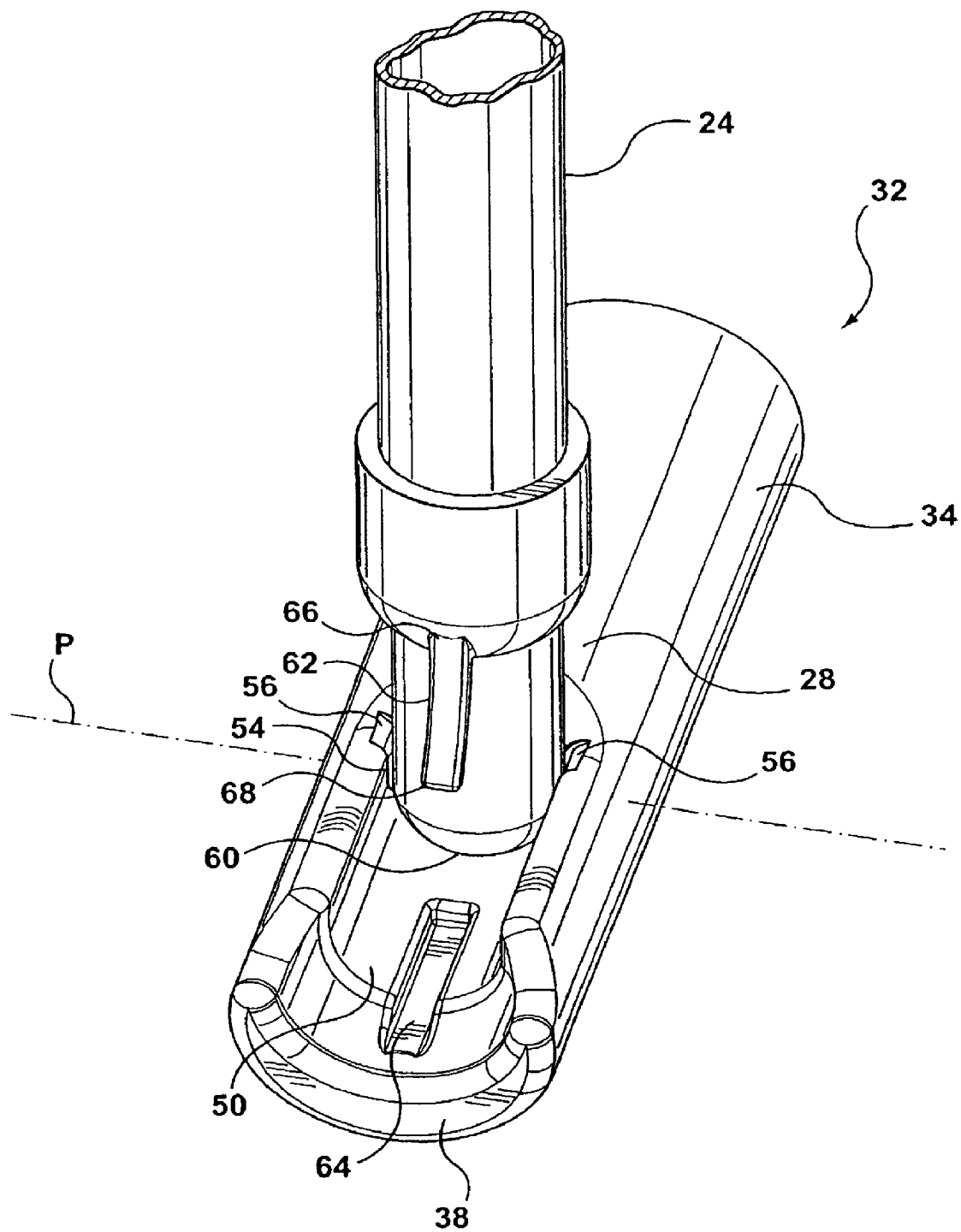
FIG. 4 shows a perspective view of a lower portion of the dispensing device of FIG. 1, showing a concave portion of the reservoir and a tailpiece at the lower end of the discharge tube.

Device 10 further includes a mechanism for pivoting reservoir 32 relative to the lower end 28 of discharge tube 24. In the embodiment shown in FIG. 4, the pivot mechanism comprises a pair of projections 54 on opposite sides of discharge tube 24, and corresponding depressions 56 in the concave portion 50 of reservoir 32. Pivot axis P passes through the projections 54 and depressions 56.

The opening 44 in the lower end 28 of discharge tube 24 may be located on the side wall of the tube 24. The opening 44 faces in a direction perpendicular to the tube axis T and with an angular spacing between the projections 54 and the centre of opening 44 being about 90 degrees, such that the opening 44 also faces in a direction perpendicular to the pivot axis P. The discharge tube 24 also has a closed end wall 60 below the opening 44.

As mentioned above, the opening 44 in discharge tube 24 communicates with the discharge opening 42 of reservoir 32 in the position shown in FIGS. 1 and 6. Therefore, the discharge opening 42 is located at point 39 at the end of the concave portion 50, facing parallel to the reservoir axis R, radially inwardly of the side wall 34.

In one embodiment, the discharge tube 24 may be cylindrical, with the concave portion 50 of the reservoir 32 being substantially semi-circular in cross-section. The discharge tube 24 may be shaped to closely engage the concave portion 50 of reservoir 32, and therefore the closed end wall 60 of discharge tube 24 is rounded. The rounded end wall 60 sealingly engages the concave portion 50 of the reservoir 32 to prevent substantial leakage of material 22 between the tube 24 and reservoir 32 during material dispensing.

Furthermore, the termination point 39 of concave portion 50 may be U-shaped as shown in FIG. 2 so as to substantially sealingly engage the side wall of discharge tube 24 immediately above the opening 44, in order to prevent substantial escape of material 22 during dispensing.

In order to retain the reservoir in the vertical position as shown in FIG. 2 during insertion into container 12, the discharge tube is provided with an elongate tail piece 62 which fits into an elongate groove 64 in the concave portion 50 of reservoir 32. The tail piece extends along the side surface of discharge tube 24 opposite the opening 44, and comprises a narrow elongate member having an upper end 66 and a lower end 68. The lower end 68 of tail piece 62 may be disposed proximate the lower end 28 of discharge tube 24 and spaced therefrom.

The elongate groove 64 in concave portion 50 is substantially parallel to the reservoir axis R. The tail piece 62 forms a snap fit with the groove 64, the snap fit being overcome when the reservoir 32 is pressed against the bottom 14 of the container 12 during installation of the device 10, as will be discussed in more detail below.

Figure 3:
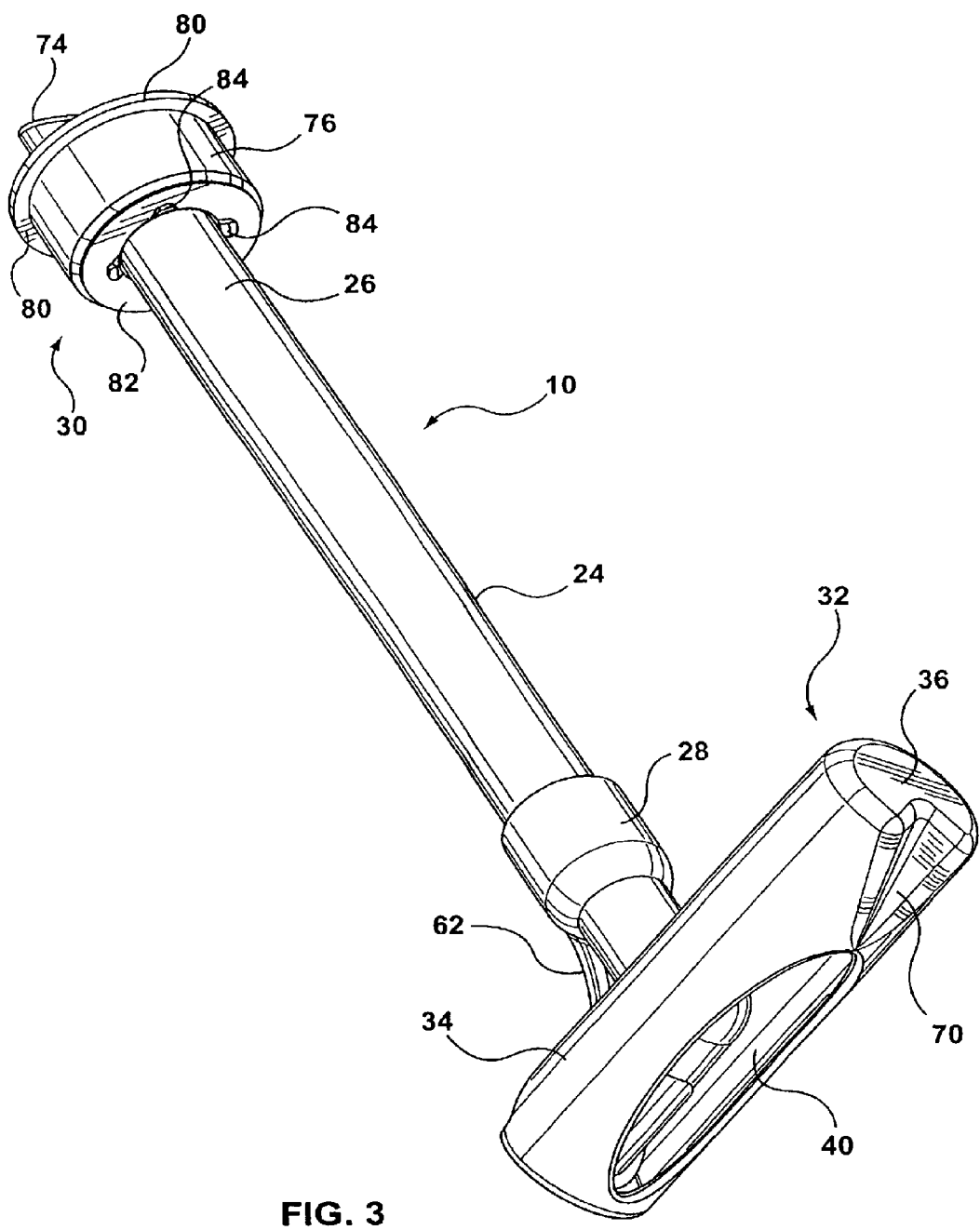
FIG. 3 shows a perspective view of the dispensing device of FIG. 1, showing an inlet opening of the reservoir and the underside of a connecting collar at the upper end of the discharge tube.
Figure 5:
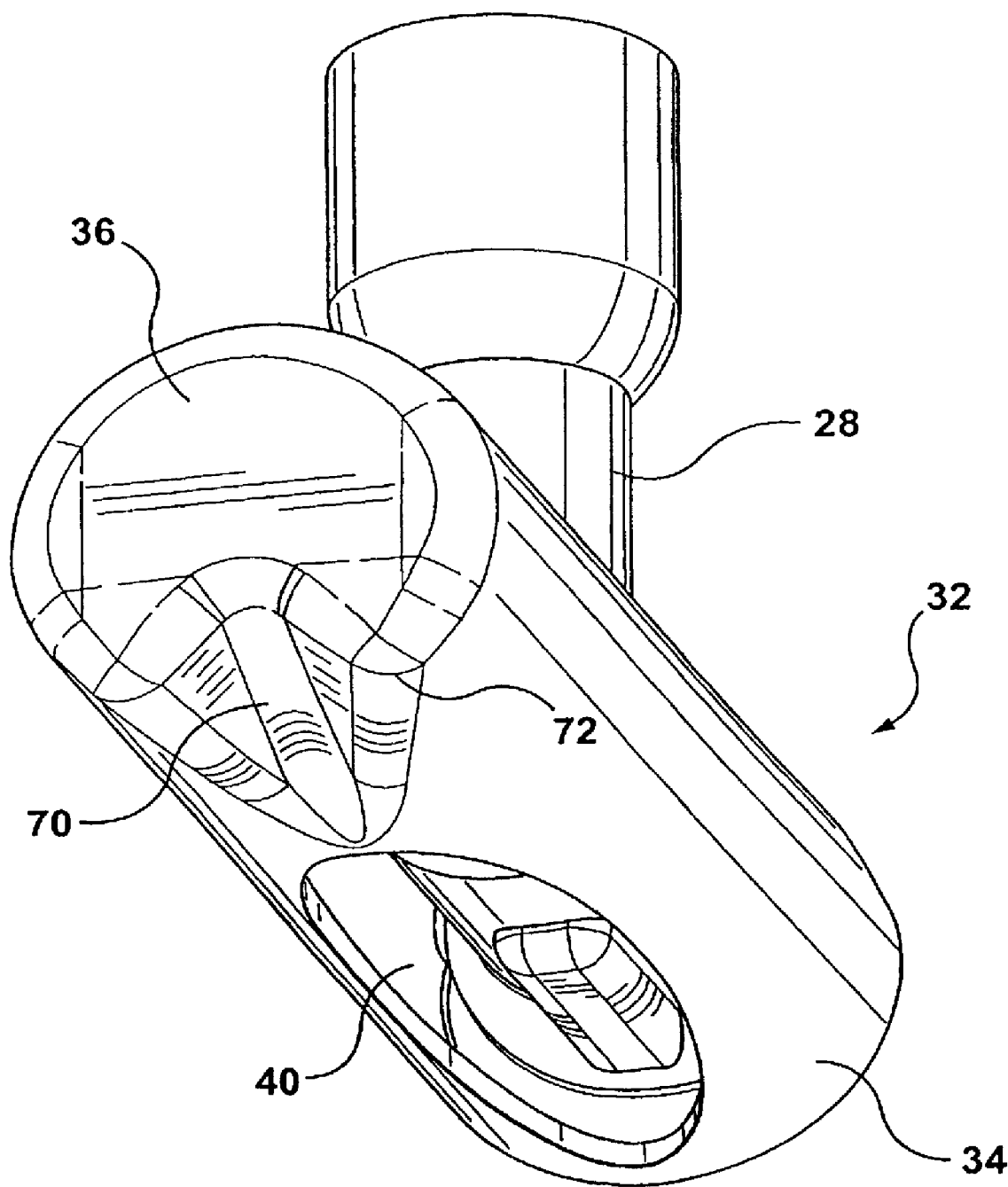
FIG. 5 shows a perspective view of a lower portion of the dispensing device of FIG. 1, showing a notched portion at the end of the reservoir.

As best seen in FIG. 3, the side wall 34 of reservoir 32 is provided with a V-shaped notch 70 extending along the reservoir axis from the inlet opening 40 of reservoir 32 to end wall 36 of reservoir 32. The notch 70 widens and deepens from the inlet opening 40 to the end wall 36. Notch 70 functions to allow excess material 22 to overflow from inlet opening 40 during inversion of container 12. As shown in FIG. 5, the provision of notch 70 causes side wall 34 of reservoir 32 to slope upwardly from the inlet opening 40 to closed end wall 36. When the device 10 is inserted into container 12, the reservoir 32 contacts the bottom 14 of container 12 at a point 72 where notch 70 intersects end wall 36 of reservoir 32. Providing an upward slope at this point assists in pivoting the reservoir 32 from the configuration shown in FIG. 2 to that shown in FIG. 1.

The connecting collar 30 may be provided with a discharge spout 74 through which the material 22 is dispensed. Spout 74 is preferably cut at an angle of about 45° to assist in pouring the material 22. The connecting collar 30 may be formed as an annular collar surrounding spout 74. In one embodiment, the connecting collar 30 includes a cylindrical side wall 76 spaced from and extending around the discharge spout 74. The cylindrical side wall 76 and discharge spout 74 may be integrally formed from a plastic material and are joined together by a plurality of webs 78 of plastic material.

The connecting collar 30 is sized to form a friction fit with the mouth 18 of container 12. Preferably, the upper end of the connecting collar 30 is provided with a radially outwardly extending lip 80 which engages the upper face of mouth 18 to assist in sealing container 12 and acting as a stop to promote proper positioning of reservoir 32 inside container 12.

The lower end of the cylindrical side wall 76 is connected to spout 74 by a discontinuous web 82 of plastic material having a plurality of openings 84 around its circumference. In the embodiment shown in FIG. 3, four such openings 84 are provided at evenly spaced 90° intervals. The openings 84 are provided to allow movement of air between the inside and outside of container 12 to provide pressure equalization, while preventing escape of the material 22 from inside the container 12. In order to perform this function, the openings 84 are preferably covered by a membrane which is permeable to air and impermeable to passage of liquid material from insider the container 12.

In one embodiment, the connecting collar 30 is further provided with a hinged flip cap (not shown) for sealing the opening of the spout 74 when not in use.

In another embodiment, as illustrated in FIG. 6, the dispensing device 10 is intended for insertion into the container 12 without initial attachment of the connecting collar 30. This facilitates the filling of the container 12 with the material 12 after insertion of the discharge tube 24 and measuring reservoir 32, but prior to attachment of the connecting collar 30. Accordingly, in this embodiment, the dispensing device includes a tube support collar 90, which engages the interior side wall 16 of the container 12 proximate the mouth opening 18 to hold the discharge tube 34 in position. The tube support collar 90 may include a collar around the discharge tube 24 and a plurality of outwardly extending spokes. An annular collar may also be provided to which the spokes connect. The annular collar may be sized to snap into engagement within the mouth opening 18 or to friction fit into place within the mouth opening 18. The tube support collar 90 holds the discharge tube 24 in its vertical position within the container 12 before attachment of the connecting collar 30.

The insertion and use of device 10 will now be described below.

Device 10 may be supplied to the user with the reservoir 32 in the vertical position as shown in FIG. 2, and with tail piece 62 engaging elongate groove 64 in a snap fit. The reservoir and discharge tube are then inserted into the open mouth 18 of container 12 until the point 72 on reservoir 32 contacts the bottom 14 of container 12. In one embodiment, the length of the discharge tube 24 is such that the height of the device 10 with the reservoir 32 in the position shown in FIG. 2 is greater that the height of container 12. Pushing the reservoir 32 against the bottom 14 of container 12 will cause pivoting of reservoir 32 to the position shown in FIG. 1. The connecting collar 30 may then be pushed into the mouth opening 18 until the lip 80 contacts the upper face of mouth 18. At this point, the inlet opening 40 of reservoir 32 is spaced slightly from the bottom 14 of container 12. With the device 10 installed in container 12, the liquid material 22 fills reservoir 32 and rises upwardly in the discharge tube 24. Inversion of the container 12 will result in the contents of the reservoir 32 and discharge tube 24 being dispensed through spout 74. When the container 12 is inverted, the inlet opening 40 of reservoir 32 is situated above the level of material 22, and therefore the amount of material dispensed from device 10 will be precisely controlled.

In another embodiment, the discharge device 10 is inserted into the container 12 in the manner described above, but without attachment of the connecting collar 30 and using the tube support collar 90. The material 22 is then inserted into the container 12, and the connecting collar 30 is then push fit onto the upper end 26 of the discharge tube 24.

The present application may be embodied in other specific forms without departing from the spirit or essential characteristics thereof. Certain adaptations and modifications of the application will be obvious to those skilled in the art. Therefore, the above discussed embodiments are considered to be illustrative and not restrictive, the scope of the application being indicated by the appended claims rather than the foregoing description, and all changes which come within the meaning and range of equivalency of the claims are therefore intended to be embraced therein.

What is claimed is:

1. A dispensing device for dispensing a pre-measured amount of a material from a container having a closed bottom and a mouth opening, said dispensing device comprising:

a discharge tube having a first end and a second end with openings being provided at the ends to permit flow of the material through the tube, the discharge tube defining a longitudinal tube axis;

a connecting collar for connecting the first end of the discharge tube to the mouth opening of the container; and a measuring reservoir attached to the second end of the discharge tube, the reservoir having a side wall defining an inlet opening and a discharge opening and forming an empty elongate body having a longitudinal reservoir axis, wherein the measuring reservoir is pivotably connected to the discharge tube about a transverse pivot axis perpendicular to the longitudinal tube axis and to the longitudinal reservoir axis, the reservoir being pivotable from a first position in which the tube axis is substantially parallel to the reservoir axis to a second position in which the tube axis and the reservoir axis are substantially perpendicular to one another, and wherein, when the reservoir is in the first position the reservoir and the discharge tube are insertable through the mouth opening of the container and the discharge opening is not in communication with the second end of the discharge tube, and wherein, when the reservoir is in the second position the discharge opening of the reservoir communicates with and sealingly engages the opening in the second end of the discharge tube.

2. The dispending device of claim 1, wherein a portion of the reservoir and a portion of the discharge tube are in overlapping relation.

3. The dispensing device of claim 2, wherein the portion of the discharge tube overlaps the portion of the reservoir when in the second position.

4. The dispensing device of claim 1, wherein the discharge tube has a length relative to the depth of the container such that, when the dispensing device is inserted, the measuring reservoir is pressed against the bottom of the container and is thereby pivoted from the first position and held in the second position.

5. The dispensing device according to claim 1, wherein the second end of the discharge tube has a cross-section smaller than a cross-section of the reservoir.

6. The dispensing device according to claim 1, wherein the second end of the discharge tube is nested within at least a portion of a sidewall of the reservoir when in the second position.

7. The dispensing device according to claim 6, wherein the inlet opening of the reservoir is formed by the sidewall at an end of the reservoir opposite the discharge opening.

8. The dispensing device according to claim 1, wherein the connecting collar comprises an annular collar having a cylindrical side wall spaced from and extending around the discharge spout, the annular collar and the discharge spout being formed from a plastic material and being joined together by at least one web of said plastic material, the annular collar forming a sealed friction fit with the mouth opening of the container.

9. A container for dispensing a pre-measured amount of a material, said container comprising:

a container wall defining a mouth opening and a closed bottom of the container; and a dispensing device, including a discharge tube having a first end and a second end with openings being provided at the ends to permit flow of the material through the tube, the discharge tube defining a longitudinal tube axis, a connecting collar connecting the first end of the discharge tube to the mouth opening of the container, and a measuring reservoir attached to the second end of the discharge tube, the reservoir having a side wall defining an inlet opening and a discharge opening and forming an empty elongate body having a longitudinal reservoir axis, wherein the measuring reservoir is pivotably connected to the discharge tube about a transverse pivot axis perpendicular to the longitudinal tube axis and to the longitudinal reservoir axis, wherein, before insertion into the container, the reservoir is pivotable from a first position in which the tube axis is substantially parallel to the reservoir axis to a second position in which the tube axis and the reservoir axis are substantially perpendicular to one another, and wherein, when the reservoir is in the first position the reservoir and the discharge tube are insertable through the mouth opening of the container and the discharge opening is not in communication with the second end of the discharge tube, and wherein, when the reservoir is in the second position the discharge opening of the reservoir communicates with and sealingly engages the opening in the second end of the discharge tube, and the reservoir is held in the second position after insertion into the container due to contact with the closed bottom end of the container that causes the reservoir to pivot into and stay in the second position.

10. The container according to claim 9, wherein a portion of the reservoir and a portion of the discharge tube are in overlapping relation.

11. The container according to claim 10, wherein the portion of the discharge tube overlaps the portion of the reservoir when in the second position.

12. The container according to claim 9, wherein the second end of the discharge tube has a cross-section smaller than a cross-section of the reservoir.

13. The container according to claim 9, wherein the second end of the discharge tube is nested within at least a portion of a sidewall of the reservoir when in the second position.

14. The container according to claim 13, wherein the inlet opening of the reservoir is formed by the sidewall at an end of the reservoir opposite the discharge opening.

15. The container according to claim 9, wherein the connecting collar comprises an annular collar having a cylindrical side wall spaced from and extending around the discharge spout, the annular collar and the discharge spout being formed from a plastic material and being joined together by at least one web of said plastic material, the annular collar forming a sealed friction fit with the mouth opening of the container.

16. The dispensing device claimed in claim 1, wherein the longitudinal tube axis and longitudinal reservoir axis are substantially aligned when the device is in the first position.

17. The container claimed in claim 9, wherein the longitudinal tube axis and longitudinal reservoir axis are substantially aligned when the device is in the first position.

* * * * *